US011270546B1

(12) United States Patent
Mosman et al.

(10) Patent No.: US 11,270,546 B1
(45) Date of Patent: Mar. 8, 2022

(54) ITEM DISPENSER WITH MOTION-BASED REMOVAL DETECTION

(71) Applicant: Amazon Technologies, Inc., Seattle, WA (US)

(72) Inventors: Mike Mosman, Everett, WA (US); Andrew Pierce, Renton, WA (US); Jacob Drewniak, Seattle, WA (US); Robert Riggs, Lynnwood, WA (US); Dan Beltzer, Issaquah, WA (US); Greg Justice, Bremerton, WA (US); Julie Yu, Alhambra, CA (US)

(*) Notice: Subject to any disclaimer, the term of this patent is extended or adjusted under 35 U.S.C. 154(b) by 51 days.

(21) Appl. No.: 16/706,528

(22) Filed: Dec. 6, 2019

(51) Int. Cl.
| | |
|---|---|
| *G07F 11/40* | (2006.01) |
| *G07F 9/02* | (2006.01) |
| *A47F 9/04* | (2006.01) |
| *B65D 83/08* | (2006.01) |
| *B65D 83/00* | (2006.01) |
| *A47F 13/08* | (2006.01) |

(52) U.S. Cl.
CPC .............. *G07F 9/026* (2013.01); *A47F 9/042* (2013.01); *A47F 13/085* (2013.01); *B65D 83/0038* (2013.01); *B65D 83/08* (2013.01); *G07F 11/40* (2013.01)

(58) Field of Classification Search
CPC .................................................... G07F 9/026
See application file for complete search history.

(56) References Cited

U.S. PATENT DOCUMENTS

| | | | | |
|---|---|---|---|---|
| 7,366,586 | B2* | 4/2008 | Kaplan ............. | G06Q 30/0238 700/241 |
| 7,942,290 | B2* | 5/2011 | Halliburton ............. | G07B 3/02 221/30 |
| 2014/0061218 | A1* | 3/2014 | Vogler .................... | G07F 11/38 221/1 |
| 2014/0299620 | A1* | 10/2014 | Swafford, Jr. ......... | A47F 1/126 221/4 |
| 2015/0102047 | A1* | 4/2015 | Tsou ....................... | G07F 9/023 221/1 |

* cited by examiner

*Primary Examiner* — Gene O Crawford
*Assistant Examiner* — Ayodeji T Ojofeitimi
(74) *Attorney, Agent, or Firm* — Lee & Hayes, P.C.

(57) ABSTRACT

This disclosure describes, in part, systems for tracking the removal of shopping bags or other items from a dispenser. Folded shopping bags are stacked in a holder so that a front shopping bag can be removed by pulling it along an axis that is parallel to the length and/or width dimension of the shopping bag. A motion sensor is positioned to sense movement of the front shopping bag as it is removed. Control logic monitors and/or analyzes data or other signals from the motion sensor and determines whether movement of at least a threshold distance has occurred. If movement of at least the threshold distance has occurred, the control logic concludes that a shopping bag has been removed and generates a corresponding event notice. Other system components may respond to the event notice by applying a charge for the removed shopping bag or by performing other actions.

20 Claims, 7 Drawing Sheets

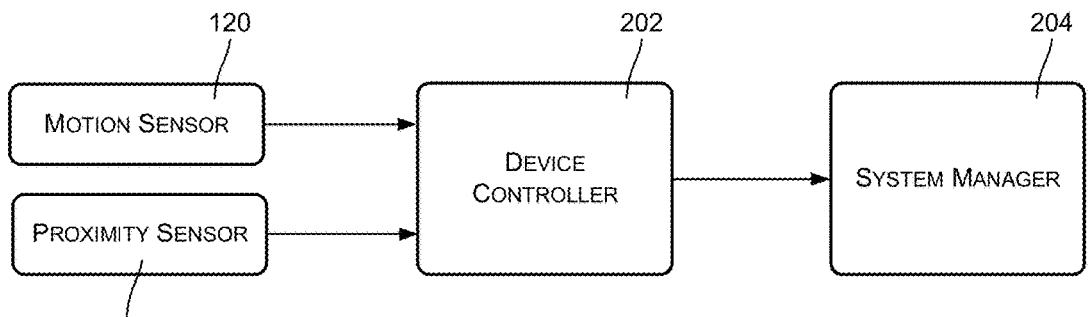
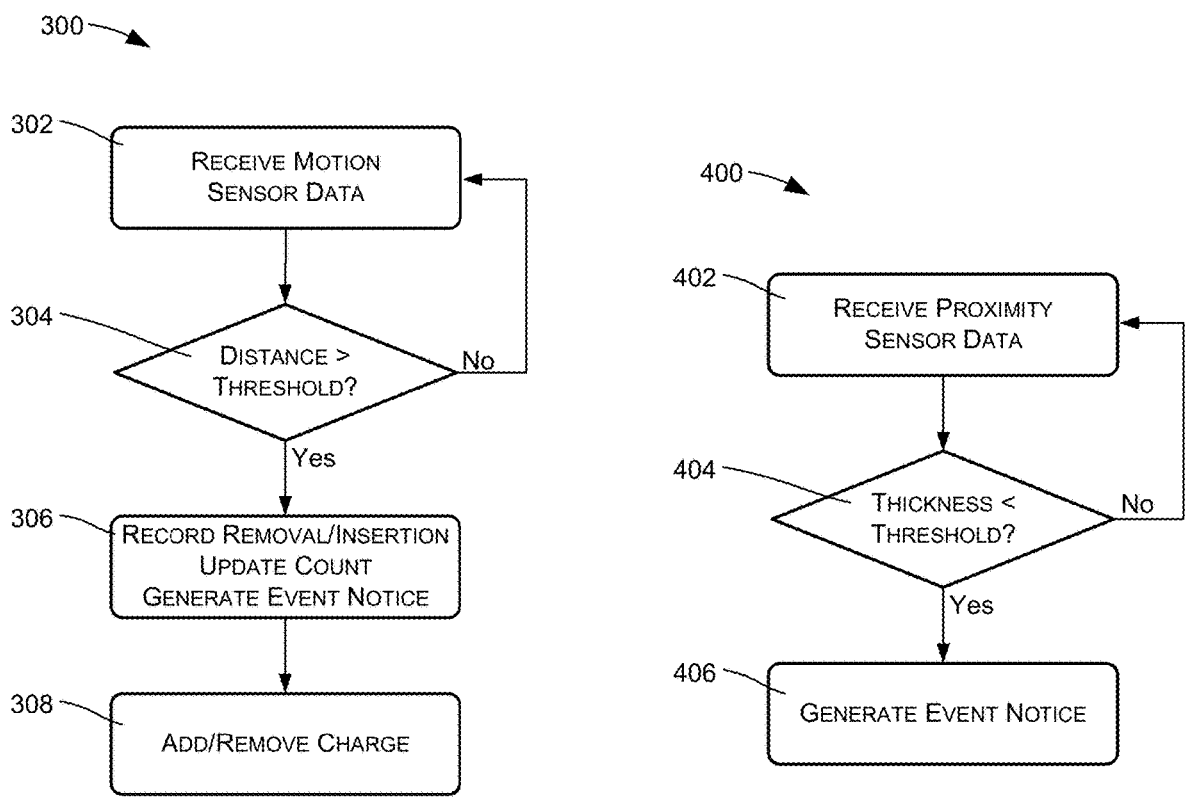

ITEM DISPENSER WITH MOTION-BASED REMOVAL DETECTION

BACKGROUND

Traditional physical stores maintain an inventory of product items in customer-accessible areas such that customers can pick items from the inventory and take them to a cashier for purchase, rental, and so forth. In some stores, automated checkout may be used. In an automated checkout store, automated systems track a customer's choices as the customer takes items from shelves. Checkout is performed automatically, so that the customer can simply leave the store when done shopping.

Retails stores may have shopping bags available for customer use. For example, plastic and/or paper bags may be available at different locations within a store so that a customer can take bags and use them for packing selected items. The customer may take a bag, for instance, for packing produce such as fruits or vegetables. Shopping bags may also be available at checkout locations for packing purchased items.

In some locations, it is desired to discourage the use of disposable bags. In these locations, a government entity may impose a fee for every disposable bag taken or used by a customer. This fee is typically charged to the customer during a checkout process.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 is a block diagram illustrating components that may be part of and/or used with the shopping bag dispenser of FIG. 1A.

FIG. 3 is a flow diagram illustrating an example method of detecting and responding to removal of a sheet item from a sheet item dispenser.

FIG. 4 is a flow diagram illustrating an example method of detecting and responding to depletion of sheet items in a sheet item dispenser.

DETAILED DESCRIPTION

Figure 1A:
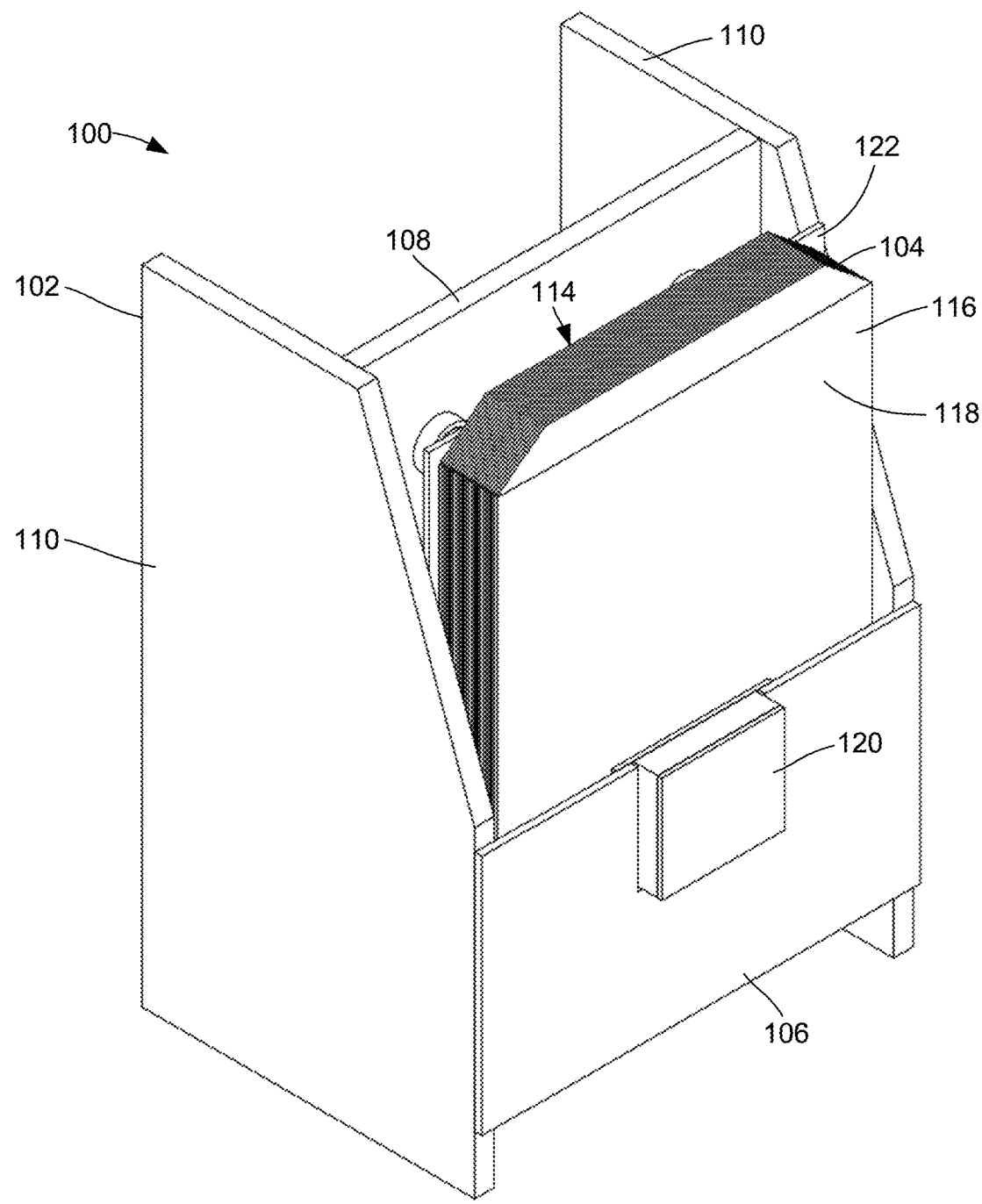
FIG. 1A is a front perspective view of a shopping bag dispenser that detects the removal of shopping bags.

This disclosure describes, in part, systems and techniques for dispensing sheet items and for monitoring the number of sheet items that have been dispensed. For example, the described systems and techniques may be used to track the number of disposable shopping bags taken from a retail store by a customer when purchasing products from the store.

Retail stores in some locations may be required to charge a fee for every disposable bag taken by a customer. For example, some states or other jurisdictions may impose a tax on the use of disposable shopping bags, and the tax may be passed on to the customer. The systems and techniques described herein may be used to automatically determine the number of disposable bags for which each customer should be charged. The systems and techniques described herein may also be useful for dispensing various types of sheet items other than shopping bags. For example, a dispenser as described herein may be used to dispense greeting cards, magazines, tickets, papers, gift cards, booklets, packets, flatly packed items, folded boxes, coupons, envelopes, stuffed envelopes, papers, materials, newspapers, napkins, tea bags, pouches, bakery tissues, popcorn bags, various types of bags other than shopping bags, food items such as candy bars, and so forth.

In a described embodiment, a bag dispenser is configured to store a stack of shopping bags that are folded or otherwise collapsed. The folded bags are oriented vertically so that a customer may grasp an individual bag and pull it upward to remove it from the dispenser. An optical motion sensor is positioned on the front of the dispenser, facing the front-most bag. The optical motion sensor is configured to sense movement of the front surface of the front-most bag and to produce motion data that can be used to determine the distance that the front surface has moved relative to the dispenser and sensor. A device controller or other operational logic analyzes the detected distance of the movement to determine whether a bag has been removed. In some embodiments, for example, the controller may compare the detected movement distance to a distance threshold and may conclude that a bag has been removed when the detected movement distance is greater than the threshold distance. As an example, the threshold distance may be in the range of 2-5 inches for some types of shopping bags, although this may vary depending on the size of the bags. For purposes of comparing the moved distance to the threshold, distance may be represented in various units, including units that may be used by the motion sensor when detecting position or movement. For example, movement might be reported in terms of pixels of the motion sensor's image sensor. Movement may also be indicated by pulses or other types of signals other than numerical positions or displacements. In some cases, a motion sensor may produce numbers that repeatedly indicate detected position of the underlying surface, which can be analyzed to determine distance of movement.

In some embodiments, the dispenser may comprise a rectangular container that is open at the top. The stack of bags is placed inside the container, oriented vertically so that individual bags can be grasped and pulled upward. The container may have a spring-loaded backplate or other biasing element to push the stack of bags against the front of the container and to thereby maintain a constant distance between the front surface of the front-most bag and the optical motion sensor. In some embodiments, a proximity sensor may be used to monitor the position of the spring-loaded backplate to provide a rough measure of how many bags are currently in the container. This information may be used to alert store personnel when the dispenser needs to be restocked.

Certain implementations and embodiments of the disclosure will now be described more fully with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A-1E illustrate an example embodiment of a bag dispenser 100 that may be used for dispensing disposable shopping bags and for generating charges for bags taken by or for a customer. Disposable shopping bags may include paper bags, plastic bags, cloth bags, or any other types of bags that are flat or collapsible (e.g., folded) for storage. Furthermore, although the embodiment of FIGS. 1A-1E is described as being a disposable bag dispenser, it may also be used for dispensing other types of items such as greeting cards, magazines, tickets, papers, gift cards, booklets, packets, flatly packed items, folded boxes, coupons, envelopes, stuffed envelopes, papers, materials, newspapers, napkins, tea bags, pouches, bakery tissues, popcorn bags, various types of bags other than shopping bags, food items such as candy bars, and so forth. Generally, the described dispenser 100 may be used with various types of flat and/or planar items that have roughly planar surfaces and are arranged to be pulled outwardly for removal. The terms "sheet", "planar", and "flat" are used herein to indicate items that are thin in comparison to their width and/or breadth.

The bag dispenser 100 in the example of FIGS. 1A-1E comprises a container 102, also referred to herein as a holder, that holds multiple folded or otherwise collapsed bags 104. More specifically, the container 102 in this embodiment is a rectangular box or frame with an open top into which the folded bags 104 are inserted.

The container 102 has a front wall 106, a back wall 108, side walls 110, and a bottom wall 112. The bags 104 are oriented vertically and stacked horizontally to form a horizontal stack 114 of the bags 104 within the container 102. The bags 104 include a front-most bag 116. The front-most bag 116 has a front surface 118 that faces the front wall 106. The front wall 106 is opposite the front surface 118 of the front-most bag 116.

Figure 1B:
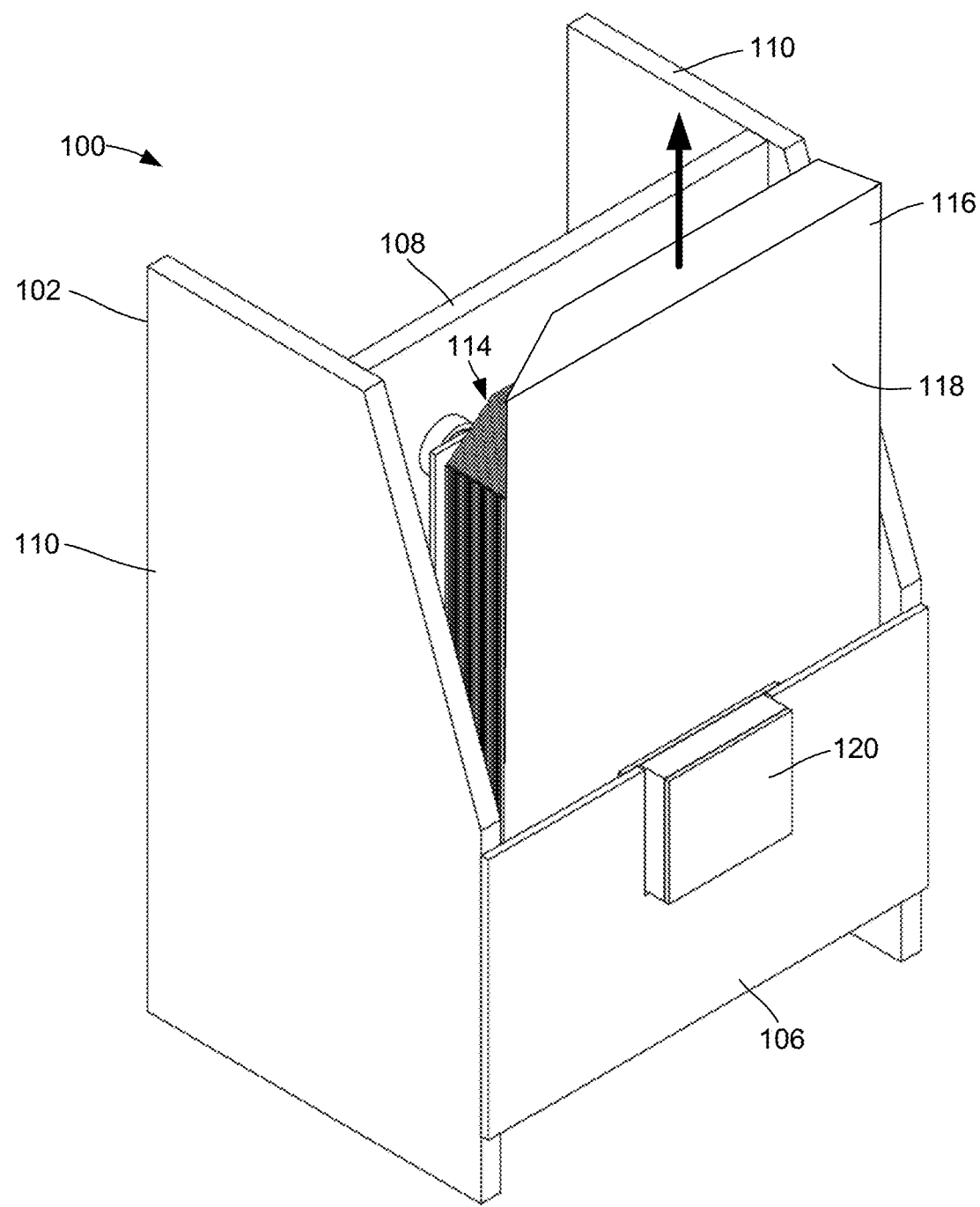
FIG. 1B is a front perspective view of the shopping bag dispenser of FIG. 1A, illustrating the upward withdrawal of a shopping bag from the shopping bag dispenser.
Figure 1C:
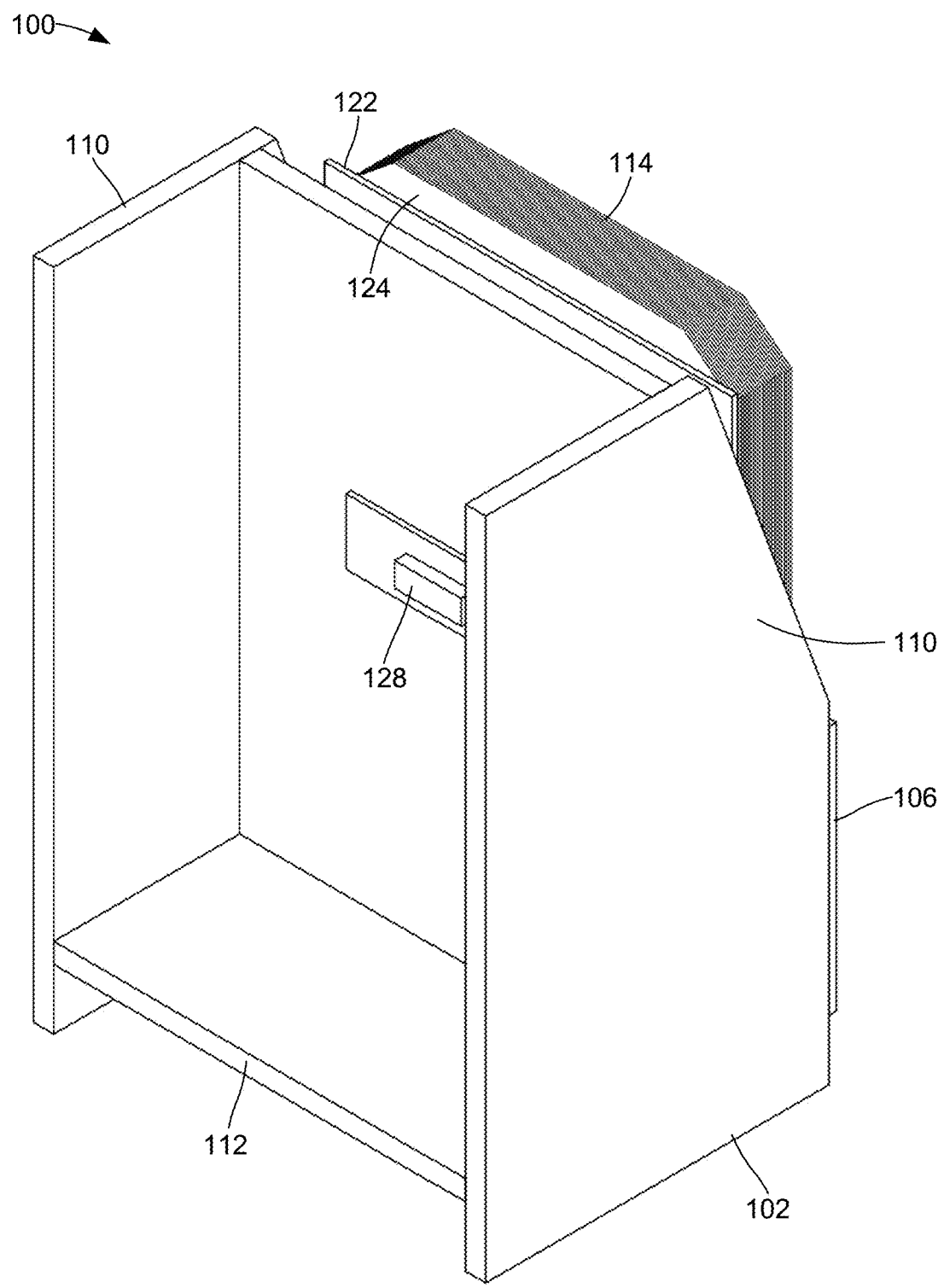
FIG. 1C is a rear perspective view of the shopping bag dispenser of FIG. 1A.
Figure 1D:
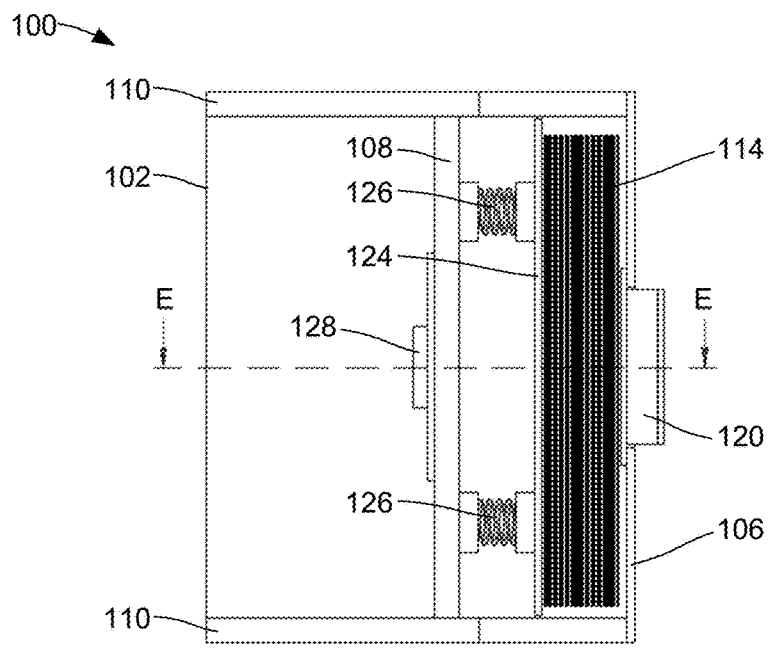
FIG. 1D is a top view of the shopping bag dispenser of FIG. 1A.
Figure 1E:
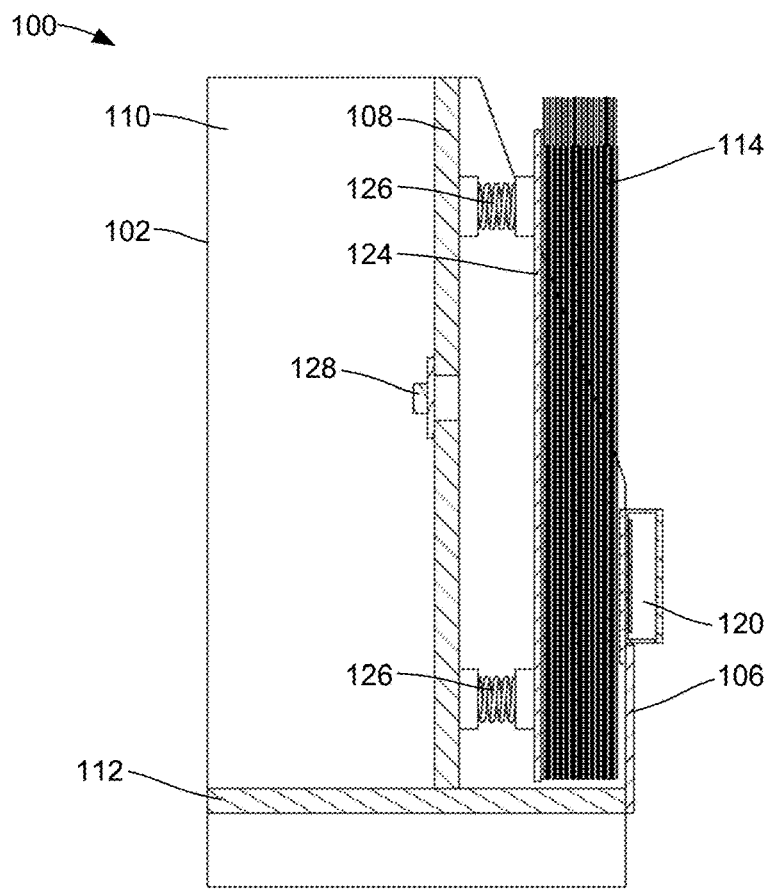
FIG. 1E is a cross-sectional side view of the shopping bag dispenser of FIG. 1a, taken along the line E-E of FIG. 1D.

As shown by FIG. 1B, the front-most bag 116 can be grasped and pulled outwardly (i.e., upwardly in this example) along an adjacent rearward bag for removal from the container 102. More generally, a bag is removed by pulling it in an outward direction, generally parallel to the plane of the collapsed bag. For purposes of this discussion, the plane of the collapsed bag is considered to be a plane formed by the length and width of the collapsed bag, perpendicular to the think axis of the bag.

Note that the terms "front," "back," "bottom," "top," and "sides" are used as convenient references to different parts of the container 102 as it is configured in a particular embodiment. In the described embodiment, the front of the dispenser 100 is the side facing a person who is removing a bag. However, in different embodiments the dispenser may be oriented differently.

The bag dispenser 100 includes a motion sensor 120 that is directed toward the front surface 118 of the front-most bag 116 to generate motion data indicating translational movement of the front-most bag 116 relative to the container 102. More specifically, the motion sensor 120 is mounted on and supported by the front wall 106 to detect upward or movement of the front-most bag 116 relative to the container 102. Although the motion sensor 120 is illustrated as being on the front or outside of the front wall 106, the motion sensor 120 is mounted through an aperture of the front wall 106 so that the front surface 118 is visible to the optical sensor 120.

In some embodiments, the motion sensor 120 may comprise an optical motion sensor such as an optical mouse sensor or a similar motion sensor. An optical mouse sensor may have an illumination source (e.g., an LED (light-emitting diode) or laser emitter) that is directed toward the front surface 118 and that illuminates microscopic patterns or texture of the front surface 118. Such an optical mouse sensor may also have a CMOS (complementary metal oxide semiconductor) image sensor that repeatedly images the front surface 118 to detect reflected light from the front surface 118. Image data from the CMOS image sensor is analyzed by a digital signal processor or other processor to determine relative movement between the front surface 118 and the motion sensor 120, based on detected movement of the microscopic patterns or textures. The motion sensor 120 may produce an output signal that continuously indicates current translational movement (e.g., distance, velocity, and/or direction).

In some embodiments, the bag dispenser 100 may include a spring-loaded or otherwise biased backplate 122 or other biasing element configured to press against a back surface 124 (FIG. 1C) of the back-most one of the bags 104. The spring-loaded backplate 122 pushes the bag stack 114 toward the front wall 106 of the container 102 in order to press the front surface 118 of the front-most bag 116 against the front wall 106 and toward or against the motion sensor 120. The spring-loaded backplate 122 may be biased toward the front of the container 102 by multiple springs 126 (FIGS. 1D and 1E) that extend from the back wall 108 of the container 102.

In some embodiments, the bag dispenser 100 may include a proximity sensor 128 that is positioned on and/or supported by the back wall 108 to sense the proximity of the spring-loaded backplate 122 to the back wall 108. The proximity sensor 128 may be any of various types of proximity sensors, including electromagnetic, infrared, capacitive, photoelectric, inducting, etc., that is directed toward the back of the backplate 122 to determine the distance of the backplate 122 from the proximity sensor 128 and/or from the back wall 108. Although the proximity sensor 128 is illustrated as being on the back or outside of the back wall 108, the proximity sensor 128 is mounted through an aperture of the back wall 106 so that the backplate 122 is exposed to the proximity sensor 128. The proximity sensor 128 is used to estimate the thickness of the bag stack 114 in order to determine when the bag dispenser 100 should be replenished.

In some cases, the container may lack a back wall, and may instead be mounted on another surface that functions in place of the back wall, such as on a wall of a room. Furthermore, the container 102 may be mounted horizontally in some cases or at other non-vertical angles. In some embodiments, elements other than springs may be used to push the bags forward. For example, gravity or a mechanism relying on gravity may be used to push the bags forward. Additionally, some embodiments may omit a backplate and the dispenser 100 may function with the bags being held loosely rather than being pushed against a front wall.

In use, the bag stack 114 is loaded into the container 102 by a store employee. A bag may at some later time be removed by a customer, such as when a customer uses the bag for produce or other items taken from a store shelf. In some situations, the bag may be removed by a store employee such as a cashier or checkout assistant who is packing purchased items for a customer at a checkout counter.

As the front-most bag 116 is removed, it slides upwardly across the underlying bag. The motion sensor 120 detects the movement and produces data regarding the movement. Associated control logic analyzes or interprets the data to determine whether movement of at least the threshold distance has occurred. If movement of at least the threshold distance is detected, the control logic concludes that a bag has been removed from the container 102. The threshold distance may vary for different bag sizes and/or container configurations. Generally, the threshold distance may be around 80% to 100% of the distance between the motion sensor 120 and the bottom of the container 102.

Note that in some cases the bag may be pushed back down into the container 102 before it is completely removed. This downward movement is also measured by the motion sensor 120 and accounted for by the control logic when determining the distance of bag movement and whether a bag has been removed.

As bags are removed from the container 102, the backplate 122 moves progressively further from the back wall 108 and closer to the front wall 106. Control logic receives proximity data from the proximity sensor 128 to calculates the distance between the backplate 122 and the front wall 106 as an indication of the current thickness of the bag stack 114. When the thickness of the bag stack 114 is less than a thickness threshold, the control logic concludes that the container 102 is nearly depleted of bags. This information may be used to trigger an alert for restocking. The thickness of the bag stack 114 as determined in this manner may also be used for inventory management.

FIG. 2 illustrates an example of operations and communications between various system components that may be used in conjunction with a bag dispenser such as described herein. These components include the motion sensor 120 and the proximity sensor 128 as already discussed. In addition, the components may include a device controller 202 that receives data or other signals from the motion sensor 120 and the proximity sensor 128, wherein the signals are indicative of (a) lateral movement of the front-most bag 116 of the stack 114 and (b) the position of the backplate 122. The term "lateral" in this context refers to a direction that is parallel to the plane of a stacked bag and/or perpendicular to the thin dimension of the bag or other sheet item.

The device controller 202 is an example of operational logic that receives and interprets signals from the motion sensor 120 and the proximity sensor 128, and that analyzes those signals to determine (a) whether a bag has or is being removed and (b) whether the dispenser 100 needs to be replenished or restocked with additional bags. The operational logic may be implemented either as part of the dispenser 100 or externally to the dispenser 100.

In use, the device controller 202 may be configured to provide notifications to a system manager 204. The system manager 204 represents any one or more of various components that may be responsible for receiving bag usage/removal information and/or for recording charges for removed bags. In some embodiments, for example, the system manager 204 may comprise a POS (point of sale) system that adds a charge for each removed bag to a customer total as the customer is checking out. For example, a bag dispenser 100 may be installed at the checkout counter of a store. As a customer checks out, either the customer or a store employee removes bags from the bag dispenser 100 for packing purchased items. As each bag is removed, the device controller notifies the POS system and the POS system adds a charge for the bag to the customer total.

In another embodiment, a retail store may have multiple bag dispensers 100 at various locations within the store. In this environment, the system manager 204 may represent one or more servers or other system management components. As the customer takes bags, these system management components identify the customer and add charges for the bags to the purchase total of the customer.

Communications between the components of FIG. 2 may be of various types and formats. For example, the motion sensor 120 and/or proximity sensor 128 may provide analog signals such as voltages to represent movement and proximity. As another example, the motion sensor 120 and/or proximity sensor 128 may provide pulsed signals or pulse trains that are indicative of motion or proximity. As another example, the motion sensor and/or proximity sensor 128 may communicate digitally, such as by using network communications or other types of communications that use digitally coded data.

Although the device controller 202 and the system manager 204 are illustrated as two discrete components, the functions described herein as being performed by the device controller 202 and the system manager 204 may be performed by any of various different components and/or combinations of components. In some cases, for example, the motion sensor 120 and proximity sensor 128 may provide data other or signals directly to the system manager 204 or to another external and/or high-level system component, and that component may be responsible for interpreting the data or other signals in order to evaluate bag movement and backplate position.

FIG. 3 illustrates an example method 300 that may be performed using an item dispenser such as the bag dispenser 100 described above. The method 300 may be used for dispensing and accounting for the use or removal of various types of sheet items, such as disposable shopping bags, greeting cards, magazines, tickets, papers, gift cards, booklets, packets, flatly packed items, folded boxes, coupons, envelopes, stuffed envelopes, papers, materials, newspapers, napkins, tea bags, pouches, bakery tissues, popcorn bags, various types of bags other than shopping bags, food items such as candy bars, and so forth, etc., and may be used in environments and facilities other than retail stores. For example, an item dispenser such as described herein may be used in a manufacturing facility to track the number of flattened boxes or other items are used in a manufacturing process. As a specific example, an item dispenser such as this may be used to detect removal of packets or envelopes containing plastic gloves used in food preparation or medical environments.

The item dispenser is configured as a container or other holder to hold multiple items that have been arranged as a stack, so that an individual one of the items can be removed by sliding it outwardly with respect to the dispenser, in a direction parallel to the plane of the sheet item and perpendicular to the thin dimension of the sheet item. In the embodiment described above, the items are held in a vertical orientation so that outward movement corresponds to upward movement. In other embodiments, however, items may be held in different orientations. For example, the container 102 might be laid on its back so that the stacked items are arranged with a horizontal orientation. In this case, outward movement would correspond to horizontal movement.

In one embodiment, the example method 300 may be performed by control logic associated with the item dispenser. In this embodiment, the control logic may be implemented by one or more computing devices such as a microprocessor, microcomputers, microcontrollers, discrete logic components, programmable arrays, or other components. In another embodiment, the example method 300 may be performed by system management components such as servers or other devices that are external to the item dispenser, such as by system management components of a retail store or other facility. In some embodiments, the method 300 may be performed by a combination of components, some of which are associated and/or integrated with the item dispenser itself and some of which are external to the item dispenser.

An action 302 comprises receiving motion sensor data, also referred to herein as motion data, regarding the outward movement of the front item of the stack of items. The motion data may be received from an optical motion sensor positioned in front of the front item to sense movement. The motion data may be represented in any digital or analog format. The motion data may indicate or may be analyzed to determine a movement distance of the front item.

An action 304 comprises determining whether the movement of the front item is of at least a threshold distance. This determination is made based at least in part on the motion data produced by the optical motion sensor, by comparing a detected movement distance to the distance threshold.

If the movement distance is not of at least the threshold distance, the actions 302 and 304 are repeated in a loop until the movement distance is at least as great as the threshold distance.

In response to determining that the movement distance of the front-most item is of at least the threshold duration, an action 306 is performed. The action 306 comprises recording removal of an individual item, updating an item count, and/or generating an event notice that indicates removal of an individual item.

The information generated and/or stored in the action 306 may be used by various components for various purposes. In the case of shopping bags, a current bag count may be maintained for each of multiple checkout lanes. Item counts or item removal notices may be provided to sales terminals or other checkout components so that charges for bags can be added automatically to customer invoice totals. In other cases, bag counts may be maintained for dispensers located at different locations within a retail store, such as in different areas of a produce section of a grocery store. In some cases, item dispensers such as this may also be used to dispense various items in an automated checkout store. In these cases, various types of technology are used to determine information relating to customers within the store. When an item is taken from an item dispenser, a charge for the item is added to the invoice total of the customer that has been identified as having taken the item.

More generally, the method 300 may be implemented in various environments to account for the use and/or removal of items. In some cases, the method 300 may be implemented to produce an event notification for every item removal. In other cases, the method 300 may be implemented to maintain a count of removed items that can be provided in response to requests by other components.

An action 308, which may be performed in an environment in which a retail store is to charge for removed items, may comprise associating removal of one or more items with a customer. In some environments, this may comprise charging the customer for an item or items that have been removed from one or more of the item dispensers by the customer. This may include adding a charge for each removed item to an account of the customer, such as by charging a credit card account. In some cases, the system may maintain a list of charges for items that are being purchased by a customer, and may add a charge to the list for each removed item. In the retail environment, for example, the action 308 may comprise adding an item and corresponding charge to a running invoice total being calculated as part of a manual or automated checkout process.

In some cases, detected movement that is evaluated in the action 304 may comprise inward movement rather than outward movement, indicating that an item has been inserted into the holder rather than being removed from it. That is, the action 304 may in some cases comprise determining that an item has been inserted into the holder. In this case, the action 306 comprises recording the insertion, updating an item count, and/or generating an event notice indicating that an item has been inserted, and the action 308 might comprise removing a previously entered charge for a previously removed item.

FIG. 4 illustrates an example method 400 that may be performed in conjunction with the method 300 of FIG. 3 to prompt store employees to replenish an item dispenser. The method 400 may be performed by the same components that perform the method 300 or by other components.

An action 402 comprises receiving proximity sensor data, also referred to herein as proximity data, regarding the proximity of a biasing element such as the backplate 122 described above. More generally, the action 402 may comprise receiving sensor data from which the position of the backplate and the thickness of the stored stack of items may be calculated. In the embodiment described above, the proximity data is received from a proximity sensor positioned in back of the stack of items that are in the container 102. The proximity sensor data may be represented in any digital or analog format and may be analyzed to determine or estimate the thickness of the stored stack of items.

An action 404 comprises determining whether the thickness of the stack of items is less than a thickness threshold. This determination is made based at least in part on the position of the backplate 122 as determined by the proximity data of the proximity sensor 128, by comparing a detected proximity to a threshold proximity or calculated thickness to a threshold thickness.

If the thickness of the stack of items is not less than the thickness threshold, the actions 402 and 404 are repeated in a loop. In response to determining that the thickness of the stack of items is less than the thickness threshold, an action 406 is performed. The action 406 comprises generating an event notice indicating that replenishment of the holder is needed. The event notice may be provided to various components such as POS systems or higher-level control components. In some cases, the event notice may comprise an audible tone or visible indicator.

Thickness that has been determined in this manner may also be used to estimate an item count or amount, such as the number of remaining items, for purposes other than restocking. For example, the thickness may be used to determine a percentage by which items held by the holder have been depleted and/or to estimate the number of items remaining in the holder. This information may be used, for example, for determining how many of the items are currently in stock and/or for other types of inventory management.

Figure 5:
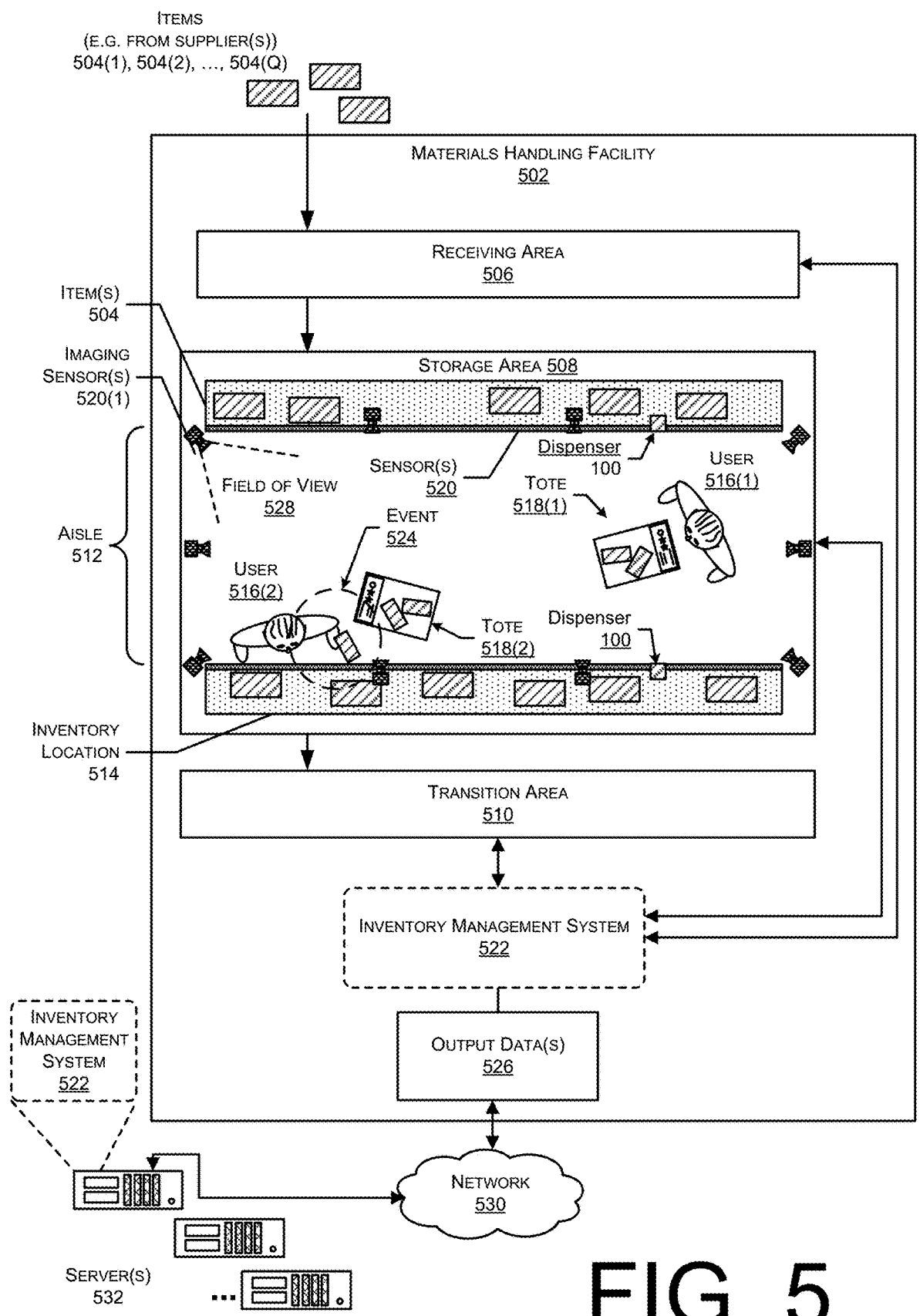
FIG. 5 is a block diagram of an example materials handling facility in which a bag dispenser as described herein may be used.
Figure 6:
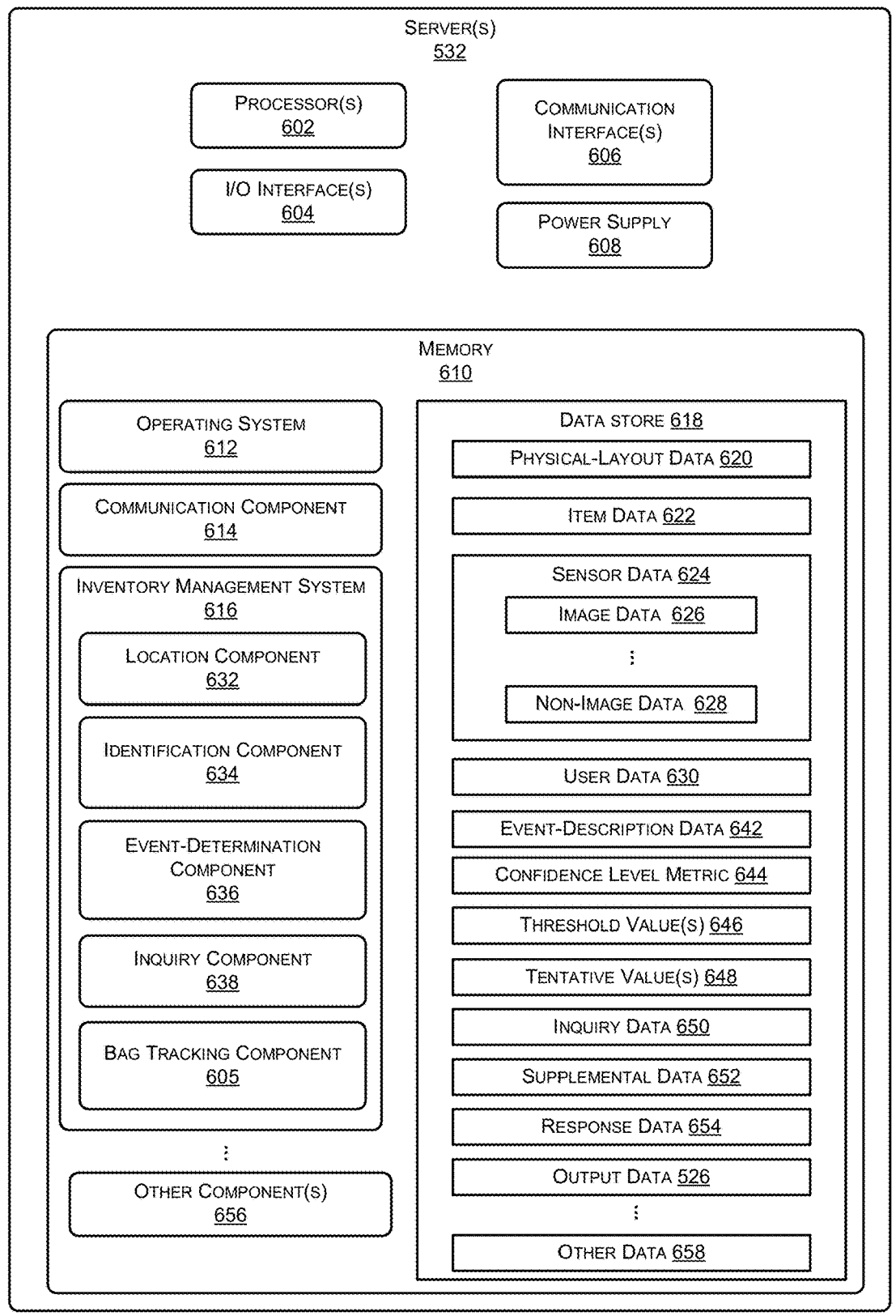
FIG. 6 is a block diagram of one or more servers configured to support operation of the facility shown in FIG. 5. As illustrated, the servers may include a bag tracking component to respond to removals of bags from one or more bag dispensers.

FIGS. 5 and 6 represent an illustrative material handing environment 502 in which the described techniques may be used. However, the following description is merely one illustrative example of an industry and environment in which the techniques described herein may be utilized.

The materials handling facility 502 (or "facility") comprises one or more physical structures or areas within which one or more items 504(1), 504(2), . . . , 504(Q) (generally denoted as 504) may be held. As used in this disclosure, letters in parenthesis such as "(Q)" indicate an integer result. The items 504 comprise physical goods, such as books, pharmaceuticals, repair parts, electronic gear, groceries, and so forth.

The facility 502 may also include one or more item dispensers 100 as described above, which are used in this environment for dispensing disposable shopping bags.

The facility 502 may include one or more areas designated for different functions with regard to inventory handling. In this illustration, the facility 502 includes a receiving area 506, a storage area 508, and a transition area 510. The receiving area 506 may be configured to accept items 504, such as from suppliers, for intake into the facility 502. For example, the receiving area 506 may include a loading dock at which trucks or other freight conveyances unload the items 504.

The storage area 508 is configured to store the items 504. The storage area 508 may be arranged in various physical configurations. In one implementation, the storage area 508 may include one or more aisles 512. The aisle 512 may be configured with, or defined by, inventory locations 514 on one or both sides of the aisle 512. The inventory locations 514 may include one or more of shelves, racks, cases, cabinets, bins, floor locations, or other suitable storage mechanisms for holding or storing the items 504. The inventory locations 514 may be affixed to the floor or another portion of the facility's structure, or may be movable such that the arrangements of aisles 512 may be reconfigurable. In some implementations, the inventory locations 514 may be configured to move independently of an outside operator. For example, the inventory locations 514 may comprise a rack with a power source and a motor, operable by a computing device to allow the rack to move from one location within the facility 502 to another.

One or more users 516(1), 516(2), . . . , 516(U), totes 518(1), 518(2), . . . , 518(T) (generally denoted as 516) or other material handling apparatus may move within the facility 502. For example, the users 516 may move about within the facility 502 to pick or place the items 504 in various inventory locations 514, placing them on totes 518 for ease of transport. An individual tote 518 is configured to carry or otherwise transport one or more items 504. For example, a tote 518 may include a basket, a cart, a bag, and so forth. In some cases, a user 516 may take a disposable bag from one of the bag dispensers 100 for use in carrying or transporting items.

In other implementations, other agencies such as robots, forklifts, cranes, aerial drones, and so forth, may move about the facility 502 picking, placing, or otherwise moving the items 504.

One or more sensors 520 may be configured to acquire information in the facility 502. The sensors 520 in the facility 502 may include sensors fixed in the environment (e.g., ceiling-mounted cameras) or otherwise, such as sensors in the possession of users (e.g., mobile phones, tablets, etc.). The sensors 520 may include, but are not limited to, cameras 520(1), weight sensors, radio frequency (RF) receivers, temperature sensors, humidity sensors, vibration sensors, and so forth. The sensors 520 may be stationary or mobile, relative to the facility 502. For example, the inventory locations 514 may contain cameras 520(1) configured to acquire images of pick or placement of items 504 on shelves, of the users 516(1) and 916(2) in the facility 502, and so forth. In another example, the floor of the facility 502 may include weight sensors configured to determine a weight of the users 516 or other object thereupon.

During operation of the facility 502, the sensors 520 may be configured to provide information suitable for tracking how objects move or other occurrences within the facility 502. For example, a series of images acquired by a camera 520(1) may indicate removal of an item 504 from a particular inventory location 514 by one of the users 516 and placement of the item 504 on or at least partially within one of the totes 518.

While the storage area 508 is depicted as having one or more aisles 512, inventory locations 514 storing the items 504, sensors 520, and so forth, it is understood that the receiving area 506, the transition area 510, or other areas of the facility 502 may be similarly equipped. Furthermore, the arrangement of the various areas within the facility 502 is depicted functionally rather than schematically. For example, multiple different receiving areas 506, storage areas 508, and transition areas 510 may be interspersed rather than segregated in the facility 502.

The facility 502 may include, or be coupled to, an inventory management system 522. The inventory management system 522 may maintain a virtual cart of each user 516 within the facility 502. The inventory management system 522 may also store a record associated with each user 516 indicating the identity of the user 516, the location of the user 516, and whether the user 516 is eligible to exit the facility 502 with one or more items 504 without performing a manual checkout of the items 504. The inventory management system 522 may also generate and output notification data to the users 516, indicating whether or not they are so eligible.

As illustrated, the inventory management system 522 may reside at the facility 502 (e.g., as part of on-premises servers), on the servers 532 that are remote from the facility 502, a combination thereof. In each instance, the inventory management system 522 is configured to identify interactions and events with and between users 516, devices such as sensors 520, robots, material handling equipment, computing devices, and so forth, in one or more of the receiving area 506, the storage area 508, or the transition area 510. As described above, some interactions may further indicate the existence of one or more events 524—or predefined activities of interest. For example, the events 524 may include the entry of the user 516 to the facility 502, stocking of items 504 at an inventory location 514, picking of an item 504 from an inventory location 514, returning of an item 504 to an inventory location 514, placement of an item 504 within a tote 518, movement of users 516 relative to one another, gestures by the users 516, and so forth. Other events 524 involving users 516 may include the user 516 providing authentication information in the facility 502, using a computing device at the facility 502 to authenticate identity to the inventory management system 522, and so forth. Some events 524 may involve one or more other objects within the facility 502. For example, the event 524 may comprise movement within the facility 502 of an inventory location 514, such as a counter mounted on wheels. Events 524 may involve one or more of the sensors 520. For example, a change in operation of a sensor 520, such as a sensor failure, change in alignment, and so forth, may be designated as an event 524. Continuing the example, movement of a camera 520(1) resulting in a change in the orientation of the field of view 528 (such as resulting from someone or something bumping the camera 520(1)) may be designated as an event 524.

By determining the occurrence of one or more of the events 524, the inventory management system 522 may generate output data 526. The output data 526 comprises information about the event 524. For example, where the event 524 comprises an item 504 being removed from an inventory location 514, the output data 526 may comprise an item identifier indicative of the particular item 504 that was removed from the inventory location 514 and a user identifier of a user that removed the item.

The inventory management system 522 may use one or more automated systems to generate the output data 526. For example, an artificial neural network, one or more classifiers, or other automated machine learning techniques may be used to process the sensor data from the one or more sensors 520 to generate output data 526. For example, the inventory management system may perform techniques for generating and utilizing a classifier for identifying user activity in image data. The automated systems may operate using probabilistic or non-probabilistic techniques. For example, the automated systems may use a Bayesian network. In another example, the automated systems may use support vector machines to generate the output data 526 or the tentative results. The automated systems may generate confidence level data that provides information indicative of the accuracy or confidence that the output data 526 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 504, user 516, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 516 may pick an item 504(1) such as a perfume bottle that is generally cubical in shape from the inventory location 514. Other items 504 at nearby inventory locations 514 may be predominately spherical. Based on the difference in shape (cube vs. sphere) from the adjacent items, and the correspondence in shape with the previously stored image of the perfume bottle item 504(1) (cubical and cubical), the confidence level that the user 516 has picked up the perfume bottle item 504(1) is high.

In some situations, the automated techniques may be unable to generate output data 526 with a confidence level above a threshold result. For example, the automated techniques may be unable to distinguish which user 516 in a crowd of users 516 has picked up the item 504 from the inventory location 514. In other situations, it may be desirable to provide human confirmation of the event 524 or of the accuracy of the output data 526. For example, some items 504 may be deemed age restricted such that they are to be handled only by users 516 above a minimum age threshold.

In instances where human confirmation is desired, sensor data associated with an event 524 may be processed to generate inquiry data. The inquiry data may include a subset of the sensor data associated with the event 524. The inquiry data may also include one or more of one or more tentative results as determined by the automated techniques, or supplemental data. The subset of the sensor data may be determined using information about the one or more sensors 520. For example, camera data such as the location of the camera 520(1) within the facility 502, the orientation of the camera 520(1), and a field of view 528 of the camera 520(1) may be used to determine if a particular location within the facility 502 is within the field of view 528. The subset of the sensor data may include images that may show the inventory location 514 or that the item 504 was stowed. The subset of the sensor data may also omit images from other cameras 520(1) that did not have that inventory location 514 in the field of view 528. The field of view 528 may comprise a portion of the scene in the facility 502 that the sensor 520 is able to generate sensor data about.

Continuing the example, the subset of the sensor data may comprise a video clip acquired by one or more cameras 520(1) having a field of view 528 that includes the item 504. The tentative results may comprise the "best guess" as to which items 504 may have been involved in the event 524. For example, the tentative results may comprise results determined by the automated system that have a confidence level above a minimum threshold.

The facility 502 may be configured to receive different kinds of items 504 from various suppliers and to store them until a customer orders or retrieves one or more of the items 504. Specifically, the items 504 may be received from one or more suppliers, such as manufacturers, distributors, wholesalers, and so forth, at the receiving area 506. In various implementations, the items 504 may include merchandise, commodities, perishables, or any suitable type of item 504, depending on the nature of the enterprise that operates the facility 502. The receiving of the items 504 may comprise one or more events 524 for which the inventory management system 522 may generate output data 526.

Upon being received from a supplier at receiving area 506, the items 504 may be prepared for storage. For example, items 504 may be unpacked or otherwise rearranged. The inventory management system 522 may include one or more software applications executing on a computer system to provide inventory management functions based on the events 524 associated with the unpacking or rearrangement. These inventory management functions may include maintaining information indicative of the type, quantity, condition, cost, location, weight, or any other suitable parameters with respect to the items 504. The items 504 may be stocked, managed, or dispensed in terms of countable, individual units or multiples, such as packages, cartons, crates, pallets, or other suitable aggregations. Alternatively, some items 504, such as bulk products, commodities, and so forth, may be stored in continuous or arbitrarily divisible amounts that may not be inherently organized into countable units. Such items 504 may be managed in terms of measurable quantity such as units of length, area, volume, weight, time, duration, or other dimensional properties characterized by units of measurement. Generally speaking, a quantity of an item 504 may refer to either a countable number of individual or aggregate units of an item 504 or a measurable amount of an item 504, as appropriate.

After arriving through the receiving area 506, items 504 may be stored within the storage area 508. In some implementations, like items 504 may be stored or displayed together in the inventory locations 514 such as in bins, on shelves, hanging from pegboards, and so forth. In this implementation, all items 504 of a given kind are stored in one inventory location 514. In other implementations, like items 504 may be stored in different inventory locations 514. For example, to optimize retrieval of certain items 504 having frequent turnover within a large physical facility 502, those items 504 may be stored in several different inventory locations 514 to reduce congestion that might occur at a single inventory location 514. Storage of the items 504 and their respective inventory locations 514 may comprise one or more events 524.

When a customer order specifying one or more items 504 is received, or as a user 516 progresses through the facility 502, the corresponding items 504 may be selected or "picked" from the inventory locations 514 containing those items 504. In various implementations, item picking may range from manual to completely automated picking. For example, in one implementation, a user 516 may have a list of items 504 they desire and may progress through the facility 502 picking items 504 from inventory locations 514 within the storage area 508, and placing those items 504 into a tote 518. In other implementations, employees of the facility 502 may pick items 504 using written or electronic pick lists derived from customer orders. These picked items 504 may be placed into the tote 518 as the employee progresses through the facility 502. Picking may comprise one or more events 524, such as the user 516 in moving to the inventory location 514, retrieval of the item 504 from the inventory location 514, and so forth.

After items 504 have been picked, they may be processed at a transition area 510. The transition area 510 may be any designated area within the facility 502 where items 504 are transitioned from one location to another or from one entity to another. For example, the transition area 510 may be a packing station within the facility 502. When the item 504 arrives at the transition area 510, the items 504 may be transitioned from the storage area 508 to the packing station. The transitioning may comprise one or more events 524. Information about the transition may be maintained by the inventory management system 522 using the output data 526 associated with those events 524.

In another example, if the items 504 are departing the facility 502 a list of the items 504 may be obtained and used by the inventory management system 522 to transition responsibility for, or custody of, the items 504 from the facility 502 to another entity. For example, a carrier may accept the items 504 for transport with that carrier accepting responsibility for the items 504 indicated in the list. In another example, a customer may purchase or rent the items 504 and remove the items 504 from the facility 502. The purchase or rental may comprise one or more events 524.

The inventory management system 522 may access or generate sensor data about the facility 502 and the contents therein including the items 504, the users 516, the totes 518, and so forth. The sensor data may be acquired by one or more of the sensors 520, data provided by other systems, and so forth. For example, the sensors 520 may include cameras 520(1) configured to acquire image data of scenes in the facility 502. The image data may comprise still images, video, or a combination thereof. The image data may be processed by the inventory management system 522 to determine a location of the user 516, the tote 518, the identity of the user 516, and so forth. As used herein, the identity of the user may represent a unique identifier of the user (e.g., name, number associated with user, username, etc.), an identifier that distinguishes the user amongst other users being located with the environment, or the like.

The inventory management system 522, or systems coupled thereto, may be configured to identify the user 516, as well as to determine other candidate users. In one implementation, this determination may comprise comparing sensor data with previously stored identity data. For example, the user 516 may be identified by showing their face to a facial recognition system, by presenting a token carrying authentication credentials, providing a fingerprint, scanning a barcode or other type of unique identifier upon entering the facility, and so forth. Identity of the user 516 may be determined before, during, or after entry to the facility 502. Determination of the user's 516 identity may comprise comparing sensor data associated with the user 516 in the facility 502 to previously stored user data.

In some instances, the inventory management system may group users within the facility into respective sessions. That is, the inventory management system 522 may utilize the sensor data to determine groups of users that are effectively "together" (e.g., shopping together). In some instances, a particular session may include multiple users that entered the facility 502 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 518. Noting the child and the mother as belonging to the same session may increase the chances of successfully adding the box of cereal to the virtual shopping cart of the mother.

By determining the occurrence of one or more events 524 and the output data 526 associated therewith, the inventory management system 522 is able to provide one or more services to the users 516 of the facility 502. By utilizing one or more human associates to process inquiry data and generate response data that may then be used to produce output data 526, overall accuracy of the system may be enhanced. The enhanced accuracy may improve the user experience of the one or more users 516 of the facility 502. In some examples, the output data 526 may be transmitted over a network 530 to one or more servers 532.

FIG. 6 illustrates a block diagram of the one or more servers 532. The servers 532 may be physically present at the facility 502, may be accessible by the network 530, or a combination of both. The servers 532 do not require end-user knowledge of the physical location and configuration of the system that delivers the services. Common expressions associated with the servers 532 may include "on-demand computing," "software as a service (SaaS)," "cloud services," "data centers," and so forth. Services provided by the servers 532 may be distributed across one or more physical or virtual devices.

The servers 532 may include one or more hardware processors 602 (processors) configured to execute one or more stored instructions. The processors 602 may comprise one or more cores. The servers 532 may include one or more input/output (I/O) interface(s) 604 to allow the processor 602 or other portions of the servers 532 to communicate with other devices. The I/O interfaces 604 may comprise Inter-Integrated Circuit (I2C), Serial Peripheral Interface bus (SPI), Universal Serial Bus (USB) as promulgated by the USB Implementers Forum, and so forth.

The servers 532 may also include one or more communication interfaces 606. The communication interfaces 606 are configured to provide communications between the servers 532 and other devices, such as the sensors 520, the interface devices, routers, and so forth. The communication interfaces 606 may include devices configured to couple to personal area networks (PANs), wired and wireless local area networks (LANs), wired and wireless wide area networks (WANs), and so forth. For example, the communication interfaces 606 may include devices compatible with Ethernet, Wi-Fi™, and so forth. The servers 532 may also include one or more busses or other internal communications hardware or software that allow for the transfer of data between the various modules and components of the servers 532.

The servers 532 may also include a power supply 608. The power supply 608 is configured to provide electrical power suitable for operating the components in the servers 532.

The servers 532 may further include one or more memories 610. The memory 610 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 610 provides storage of computer-readable instructions, data structures, program modules, and other data for the operation of the servers 532. A few example functional modules are shown stored in the memory 610, although the same functionality may alternatively be implemented in hardware, firmware, or as a system on a chip (SOC).

The memory 610 may include at least one operating system (OS) component 612. The OS component 612 is configured to manage hardware resource devices such as the I/O interfaces 604, the communication interfaces 606, and provide various services to applications or components executing on the processors 602. The OS component 612 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 610. These components may be executed as foreground applications, background tasks, daemons, and so forth. A communication component 614 may be configured to establish communications with one or more of the sensors 520, one or more of the devices used by associates, other servers 532, or other devices. The communications may be authenticated, encrypted, and so forth.

The memory 610 may store an inventory management system 616. The inventory management system 616 is configured to provide the inventory functions as described herein with regard to the inventory management system 522. For example, the inventory management system 616 may track movement of items 504 in the facility 502, generate user interface data, and so forth.

The inventory management system 616 may access information stored in one or more data stores 618 in the memory 610. The data store 618 may use a flat file, database, linked list, tree, executable code, script, or other data structure to store the information. In some implementations, the data store 618 or a portion of the data store 618 may be distributed across one or more other devices including other servers 532, network attached storage devices, and so forth.

The data store 618 may include physical layout data 620. The physical layout data 620 provides a mapping of physical locations within the physical layout of devices and objects such as the sensors 520, inventory locations 514, and so forth. The physical layout data 620 may indicate the coordinates within the facility 502 of an inventory location 514, sensors 520 within view of that inventory location 514, and so forth. For example, the physical layout data 620 may include camera data comprising one or more of a location within the facility 502 of a camera 520(1), orientation of the camera 520(1), the operational status, and so forth. Continuing example, the physical layout data 620 may indicate the coordinates of the camera 520(1), pan and tilt information indicative of a direction that the field of view 528 is oriented along, whether the camera 520(1) is operating or malfunctioning, and so forth.

In some implementations, the inventory management system 616 may access the physical layout data 620 to determine if a location associated with the event 524 is within the field of view 528 of one or more sensors 520. Continuing the example above, given the location within the facility 502 of the event 524 and the camera data, the inventory management system 616 may determine the cameras 520(1) that may have generated images of the event 524.

The item data 622 comprises information associated with the items 504. The information may include information indicative of one or more inventory locations 514 at which one or more of the items 504 are stored. The item data 622 may also include order data, SKU or other product identifier, price, quantity on hand, weight, expiration date, images of the ITEM 504, detail description information, ratings, ranking, and so forth. The inventory management system 616 may store information associated with inventory management functions in the item data 622.

The data store 618 may also include sensor data 624. The sensor data 624 comprises information acquired from, or based on, the one or more sensors 520. For example, the sensor data 624 may comprise 3D information about an object in the facility 502. As described above, the sensors 520 may include a camera 520(1), which is configured to acquire one or more images. These images may be stored as the image data 626. The image data 626 may comprise information descriptive of a plurality of picture elements or pixels. Non-image data 628 may comprise information from other sensors 520, such as input from the microphones, weight sensors, item dispensers, and so forth. Non-image data may include sensor data from the optical motion sensor 120 and the proximity sensor 128.

User data 630 may also be stored in the data store 618. The user data 630 may include identity data, information indicative of a profile, purchase history, location data, images of the user 516, demographic data, and so forth. Individual users 516 or groups of users 516 may selectively provide user data 630 for use by the inventory management system 522. The individual users 516 or groups of users 516 may also authorize collection of the user data 630 during use of the facility 502 or access to user data 630 obtained from other systems. For example, the user 516 may opt-in to collection of the user data 630 to receive enhanced services while using the facility 502.

In some implementations, the user data 630 may include information designating a user 516 for special handling. For example, the user data 630 may indicate that a particular user 516 has been associated with an increased number of errors with respect to output data 526. The inventory management system 616 may be configured to use this information to apply additional scrutiny to the events 524 associated with this user 516. For example, events 524 that include an item 504 having a cost or result above the threshold amount may be provided to the associates for processing regardless of the determined level of confidence in the output data 526 as generated by the automated system.

The inventory management system 616 may include one or more of a location component 632, identification component 634, event-determination component 636, inquiry component 638, and bag tracking component 605, potentially amongst other components 656.

The location component 632 functions to locate items or users within the environment of the facility to allow the inventory management system 616 to assign certain events to the correct users. For example, the location component 632 may determine which users have removed bags from the bag dispensers 100.

The location component 632 may assign unique identifiers to users as they enter the facility and, with the users' consent, may locate the users throughout the facility 502 over the time they remain in the facility 502. The location component 632 may perform this locating using sensor data 624, such as the image data 626. For example, the location component 632 may receive the image data 626 and may use facial-recognition techniques to identify users from the images. After identifying a particular user within the facility, the location component 632 may then locate the user within the images as the user moves throughout the facility 502. Further, should the location component 632 temporarily "lose" a particular user, the location component 632 may again attempt to identify the users within the facility based on facial recognition, and/or using other techniques such as voice recognition, or the like.

Therefore, upon receiving the indication of the time and location of the event in question, the location component 632 may query the data store 618 to determine which one or more users were at or within a threshold distance of the location of the event at the particular time of the event. Further, the location component 632 may assign different confidence levels to different users, with the confidence levels indicating how likely it is that each corresponding user is the user that is in fact associated with the event of interest.

The location component 632 may access the sensor data 624 in order to determine this location data of the user and/or items. The location data provides information indicative of a location of an object, such as the item 504, the user 516, the tote 518, the bag dispenser 100, and so forth. The location may be absolute with respect to the facility 502 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 502, 5.2 m from an inventory location 514 along a heading of 169°, and so forth. For example, the location data may indicate that the user 516(1) is 25.2 m along the aisle 512(1) and standing in front of the inventory location 514. In comparison, a relative location may indicate that the user 516(1) is 32 cm from the tote 518 at a heading of 73° with respect to the tote 518. The location data may include orientation information, such as which direction the user 516 is facing. The orientation may be determined by the relative direction the user's 916 body is facing. In some implementations, the orientation may be relative to the interface device. Continuing the example, the location data may indicate that the user 516(1) is oriented with a heading of 0°, or looking north. In another example, the location data may indicate that the user 516 is facing towards the interface device.

The identification component 634 is configured to identify an object. In one implementation, the identification component 634 may be configured to identify an item 504. In another implementation, the identification component 634 may be configured to identify the user 516. For example, the identification component 634 may use facial recognition techniques to process the image data 626 and determine the identity data of the user 516 depicted in the images by comparing the characteristics in the image data 626 with previously stored results. The identification component 634 may also access data from other sensors 520, such as from an RFID reader, an RF receiver, fingerprint sensors, and so forth.

The event-determination component 636 is configured to process the sensor data 624 and generate output data 626. The event-determination component 636 may access information stored in the data store 618 including, but not limited to, event description data 642, confidence levels 644, or threshold values 646. The event-determination component 636 may be configured to create and utilize event classifiers for identifying events (e.g., predefined activity) within image data, potentially without use of other sensor data acquired by other sensors in the environment, such as by the bag dispensers 100 and/or the sensors of the bag dispensers 100.

The event description data 642 comprises information indicative of one or more events 524. For example, the event description data 642 may comprise predefined profiles that designate movement of an item 504 from an inventory location 514 with the event 524 of "pick". The event description data 642 may be manually generated or automatically generated. The event description data 642 may include data indicative of triggers associated with events occurring in the facility 502. An event may be determined as occurring upon detection of the trigger. For example, sensor data 624 such as a change in weight from a weight sensor 520(6) at an inventory location 514 may trigger detection of an event of an item 504 being added or removed from the inventory location 514. In another example, the trigger may comprise an image of the user 516 reaching a hand toward the inventory location 514. In yet another example, the trigger may comprise two or more users 516 approaching to within a threshold distance of one another.

The event-determination component 636 may process the sensor data 624 using one or more techniques including, but not limited to, artificial neural networks, classifiers, decision trees, support vector machines, Bayesian networks, and so forth. For example, the event-determination component 636 may use a decision tree to determine occurrence of the "pick" event 524 based on sensor data 624. The event-determination component 636 may further use the sensor data 624 to determine one or more tentative results 648. The one or more tentative results 648 comprise data associated with the event 524. For example, where the event 524 comprises a disambiguation of users 516, the tentative results 648 may comprise a list of possible user 516 identities. In another example, where the event 524 comprises a disambiguation between items 504, the tentative results 648 may comprise a list of possible item identifiers. In some implementations, the tentative result 648 may indicate the possible action. For example, the action may comprise the user 516 picking, placing, moving an item 504, damaging an item 504, providing gestural input, and so forth.

In some implementations, the tentative results 648 may be generated by other components. For example, the tentative results 648 such as one or more possible identities or locations of the user 516 involved in the event 524 may be generated by the location component 632. In another example, the tentative results 648 such as possible items 504 that may have been involved in the event 524 may be generated by the identification component 634.

The event-determination component 636 may be configured to provide a confidence level 644 associated with the determination of the tentative results 648. The confidence level 644 provides indicia as to the expected level of accuracy of the tentative result 648. For example, a low confidence level 644 may indicate that the tentative result 648 has a low probability of corresponding to the actual circumstances of the event 524. In comparison, a high confidence level 644 may indicate that the tentative result 648 has a high probability of corresponding to the actual circumstances of the event 524.

In some implementations, the tentative results 648 having confidence levels 644 that exceed the threshold may be deemed to be sufficiently accurate and thus may be used as the output data 526. For example, the event-determination component 636 may provide tentative results 648 indicative of the three possible items 504(1), 904(2), and 904(3) corresponding to the "pick" event 524. The confidence levels 644 associated with the possible items 504(1), 904(2), and 504(3) may be 25%, 70%, 92%, respectively. Continuing the example, the threshold result 646 may be set such that confidence level 644 of 90% are deemed to be sufficiently accurate. As a result, the event-determination component 636 may designate the "pick" event 524 as involving item 504(3).

The inquiry component 638 may be configured to use at least a portion of the sensor data 624 associated with the event 524 to generate inquiry data 650. In some implementations, the inquiry data 650 may include one or more of the tentative results 648 or supplemental data 652. The inquiry component 638 may be configured to provide inquiry data 650 to one or more devices associated with one or more human associates.

An associate user interface is presented on the respective devices of associates. The associate may generate response data 654 by selecting a particular tentative result 648, entering new information, indicating that they are unable to answer the inquiry, and so forth.

The supplemental data 652 comprises information associated with the event 524 or that may be useful in interpreting the sensor data 624. For example, the supplemental data 652 may comprise previously stored images of the items 504. In another example, the supplemental data 652 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 526 during presentation to an associate.

The inquiry component 638 processes the response data 654 provided by the one or more associates. The processing may include calculating one or more statistical results associated with the response data 654. For example, statistical results may include a count of the number of times associates selected a particular tentative result 648, determination of a percentage of the associates that selected a particular tentative result 648, and so forth.

The inquiry component 638 is configured to generate the output data 526 based at least in part on the response data 654. For example, given that a majority of the associates returned response data 654 indicating that the item 504 associated with the "pick" event 524 is item 504(5), the output data 526 may indicate that the item 504(5) was picked.

The inquiry component 638 may be configured to selectively distribute inquiries to particular associates. For example, some associates may be better suited to answering particular types of inquiries. Performance data, such as statistical data about the performance of the associates, may be determined by the inquiry component 638 from the response data 654 provided by the associates. For example, information indicative of a percentage of different inquiries in which the particular associate selected response data 654 that disagreed with the majority of associates may be maintained. In some implementations, test or practice inquiry data 650 having a previously known correct answer may be provided to the associate for training or quality assurance purposes. The determination of the set of associates to use may be based at least in part on the performance data.

By using the inquiry component 638, the event-determination component 636 may be able to provide high reliability output data 526 that accurately represents the event 524. The output data 526 generated by the inquiry component 638 from the response data 654 may also be used to further train the automated systems used by the inventory management system 616. For example, the sensor data 624 and the output data 526, based on response data 654, may be provided to one or more of the components of the inventory management system 616 for training in process improvement. Continuing the example, this information may be provided to an artificial neural network, Bayesian network, and so forth, to further train these systems such that the confidence level 644 and the tentative results 648 produced in the future for the same or similar input is improved. Finally, as FIG. 6 illustrates, the servers 532 may store and/or utilize other data 658.

The bag tracking component 605, meanwhile, may perform some or all of the operations described above with reference to the methods 300 and 400. For instance, the bag tracking component 605 may maintain a count of bags that have been dispensed to each of multiple users, to be used when recording user charges. In some embodiments, the bag tracking component 605 may generate the event notices discussed herein.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system for dispensing folded shopping bags, comprising:
    a holder configured to store a stack of the folded shopping bags, the holder having an open top, wherein each of the folded shopping bags is oriented to be grasped and pulled outwardly by a customer for removal from the holder, the holder having a front wall that is opposite a front surface of a front-most one of the folded shopping bags;
    an optical motion sensor supported by the front wall of the holder, the optical motion sensor being directed toward the front surface of the front-most one of the folded shopping bags to detect translational movement of the front-most one of the folded shopping bags relative to the holder; and
    operational logic configured to perform actions comprising:
        receiving first motion data from the optical motion sensor regarding the translational movement of the front-most one of the folded shopping bags;
        determining that the front-most one of the folded shopping bags has moved by at least a threshold distance based at least in part on the first motion data received from the optical motion sensor;
        in response to determining that the front-most one of the folded shopping bags has moved by at least the threshold distance, generating a first event notice to indicate removal of a first folded shopping bag from the holder;
        determining that a second folded shopping bag has been inserted into the holder based at least in part on second motion data; and
        in response to determining that a second folded shopping bag has been inserted into the holder, generating a second event notice to indicate that the second folded shopping bag has been inserted into the holder.

2. The system as recited in claim 1, the operational logic being configured to perform further actions comprising:
    in response to the first event notice, charging a customer for the first folded shopping bag.

3. The system as recited in claim 1, wherein the holder has a spring-loaded backplate configured to press against a back surface of a back-most one of the folded shopping bags to push the stack of the folded shopping bags toward the front wall of the holder.

4. The system as recited in claim 3, further comprising a proximity sensor positioned to detect proximity of the spring-loaded backplate, the operational logic being configured to perform further actions comprising:
    receiving proximity data from the proximity sensor regarding proximity of the spring-loaded backplate to the proximity sensor;
    based at least in part on the proximity data, determining that a thickness of the stack of the folded shopping bags is less than a thickness threshold; and
    in response to determining that a thickness of the stack of the folded shopping bags is less than a thickness threshold, generating a third event notice to indicate that the folded shopping bags should be replenished.

5. A dispenser for shopping bags, comprising:
    a holder configured to store a plurality of shopping bags, wherein the shopping bags are oriented to allow a front-most one of the shopping bags to be grasped and pulled for removal from the holder;
    an optical sensor directed toward the front-most one of the shopping bags to generate first motion data indicating translational movement of the front-most one of the shopping bags relative to the holder; and
    operational logic configured to perform actions comprising:
        determining that the front-most one of the shopping bags has moved by at least a threshold distance based at least in part on the first motion data;
        in response to determining that the front-most one of the shopping bags has moved by at least the threshold distance, generating a first event notice to indicate removal of a first shopping bag from the holder;

determining that a second shopping bag has been inserted into the holder based at least in part on second motion data; and in response to determining that the second shopping bag has been inserted into the holder, generating a second event notice to indicate that the second shopping bag has been inserted into the holder.

6. The dispenser as recited in claim 5, wherein the first motion data indicates outward movement of the front-most shopping bag from the holder and the second motion data indicates inward movement of the second shopping into the holder.

7. The dispenser as recited in claim 5, further comprising:
a biasing element configured to push the shopping bags toward the optical sensor; and
a sensor configured to detect a position of the biasing element.

8. The dispenser as recited in claim 5, the operational logic being configured to perform further actions comprising:
in response to the first event notice, associating removal of the first shopping bag with an account of a customer.

9. The dispenser as recited in claim 5, the holder comprising:
a front wall;
a backplate configured to press the shopping bags against the front wall; and
a proximity sensor positioned to detect proximity of the backplate;
the operational logic being configured to perform further actions comprising:
receiving proximity data from the proximity sensor;
based at least in part on the proximity data, determining a position of the backplate; and
based at least in part on the position of the backplate, determining data indicative of an amount of shopping bags held by the dispenser.

10. The dispenser as recited in claim 5, the holder comprising:
a front wall;
a backplate configured to press the shopping bags against the front wall; and
a proximity sensor positioned to detect proximity of the backplate;
the operational logic being configured to perform further actions comprising:
receiving proximity data from the proximity sensor;
based at least in part on the proximity data, determining a position of the backplate;
based at least in part on the position of the backplate, determining that a thickness of the shopping bags is less than a thickness threshold; and
in response to determining that the thickness of the of shopping bags is less than the thickness threshold, generating a third event notice to indicate that the shopping bags should be replenished.

11. The dispenser as recited in claim 5, wherein the optical sensor comprises:
a light source to direct light onto the front-most one of the shopping bags; and
a light detector to detect reflected light from the front-most one of the shopping bags to generate the first motion data.

12. A method for detecting removal or insertion of planar items that are stacked in a holder for individual withdrawal, the method comprising:
receiving first data from an optical sensor, the first data indicating translational movement of a first planar item;
determining that the translational movement is of at least a threshold distance based at least in part on the first data;
in response to determining that the translational movement is of at least the threshold distance, recording a removal of the first planar item from the holder;
receiving second data from the optical sensor;
determining that a second planar item has been inserted into the holder based at least part on the second data; and
in response to determining that the second planar item has been inserted into the holder, recording an insertion of the second planar item into the holder.

13. The method as recited in claim 12, further comprising associating removal of the first planar item with an account of a customer.

14. The method as recited in claim 12, further comprising:
maintaining a list of charges for items that are being purchased by a customer; and
adding a charge for the first planar item to the list of charges.

15. The method as recited in claim 12, wherein the optical sensor comprises a light source to direct light onto the first planar item and a light detector to detect reflected light from the first planar item to determine the translational movement.

16. The method as recited in claim 12, wherein the planar items comprise disposable shopping bags.

17. The method as recited in claim 12, further comprising:
receiving third data from a proximity sensor positioned to detect proximity of at least one of the planar items; and
based at least in part on the third data, determining a count of planar items in the holder.

18. The method as recited in claim 12, further comprising:
receiving third data from a proximity sensor positioned to detect proximity of at least one of the planar items;
determining, based at least in part on the third data, that the holder should be replenished; and
in response to determining that the holder should be replenished, generating a notification to replenish the holder.

19. The method as recited in claim 12, wherein the holder has a biasing element configured to push the planar items toward the optical sensor, the method further comprising determining a count of planar items in the holder based at least in part on a position of the biasing element.

20. The method as recited in claim 12, wherein the first data indicates outward movement of the first planar item from the holder and the second data indicates inward movement of the second planar item into the holder.

* * * * *